J. A. BOWDEN.
TIRE.
APPLICATION FILED DEC. 5, 1908.

931,989.

Patented Aug. 24, 1909.

Witnesses:
Frank Labraham
Louis W. Gratz

Inventor,
Junius A. Bowden
by
Townsend Haus & Hackley
attys

UNITED STATES PATENT OFFICE.

JUNIUS A. BOWDEN, OF LOS ANGELES, CALIFORNIA.

TIRE.

931,989.  Specification of Letters Patent.  Patented Aug. 24, 1909.

Application filed December 5, 1908. Serial No. 466,178.

*To all whom it may concern:*

Be it known that I, JUNIUS A. BOWDEN, a citizen of the United States, residing at Los Angeles, in the county of Los Angeles and State of California, have invented new and useful Improvements in Tires, of which the following is a specification.

This invention relates to tires in which a stud is arranged in the tread thereof which stud may or may not be detachable, and the object of the invention is to provide means for more securely retaining the stud or stud holding means in place.

In the preferred form the stud is of metal and is riveted or interlocked in the tire and in this form my invention will apply directly to the stud and more securely hold the same than by any method heretofore known.

In another form of the invention the stud is detachably retained in a receptacle which receptacle is retained permanently in the tire, and in that form this invention will more securely retain the receptacle than would the mere interlocking of the receptacle with the rubber or its being vulcanized thereto.

Further objects of the invention are to attain the foregoing results by simple and inexpensive means of great durability and strength.

Figure 1:
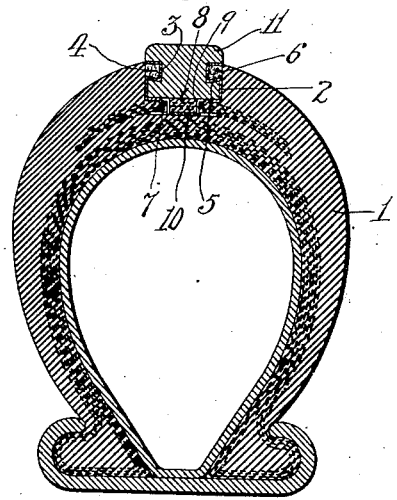
Figure 3:
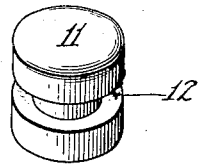
Figure 4:
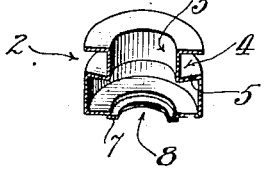
Figure 5:
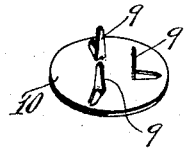
Figure 2:
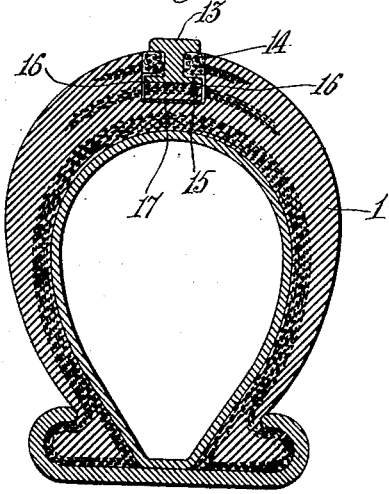
Figure 6:
Figure 7:
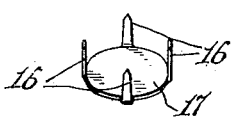

Referring to the drawings:—Figure 1 is a cross sectional view through a tire, showing my invention as used with one form of said stud and stud attaching means. Fig. 2 is a similar view showing my invention as employed with another form of stud in which the stud receptacle is dispensed with. Fig. 3 is an enlarged perspective view of the detachable stud shown in Fig. 1. Fig. 4 is a perspective view, partly in section, on a large scale, of the stud receptacle. Fig. 5 is a perspective view of one form of anchor plate. Fig. 6 is a perspective view of the stud employed in Fig. 2. Fig. 7 is a perspective view of another form of anchor plate.

Referring to the form shown in Fig. 1, 1 designates the body of the tire which is of the usual construction. Embedded in the tire 1 is a metal receptacle 2. This receptacle is formed with a reduced neck portion 3 thus leaving an annular groove 4. The lower wall 5 of the groove 4 is inclined or dished inwardly and downwardly, as indicated in Fig. 1, thus giving a dove-tailed section which interlocks with the tire. The main body of the tire 1 may enter this dove-tailed groove or the receptacle may be vulcanized in place by first cleaning the receptacle with an acid, then applying a cement, and then winding threads 6 in the groove and vulcanizing the threads to the cement and to the rubber body of the tire. This produces a perfect vulcanized union between the metal and the body of the tire, and the dove-tailed construction of the groove forms a mechanical interlock which tends to retain the filling material within the groove even when the receptacle is exposed to an extreme strain tending to dislodge it.

The bottom of the receptacle 2 is sunken, as at 7, and is centrally perforated, as at 8, to receive prongs 9 which project up from an anchor disk or plate 10. The prongs 9 may be struck up from the disk 10, as indicated in Fig. 5, or they may be bent up from the edge of the disk, as in Fig. 7. The upper ends of the prongs 9 or 16 are bent over the inner edge of the sunken portion 7, as clearly shown in Fig. 1, thereby mechanically locking the receptacle in place, the length of the prongs being sufficient to give considerable space between the anchor 10 and bottom of the receptacle 2, which intervening space is filled by cotton, canvas, and rubber or other material forming the body of the tire and the anchor plate itself is firmly held in position.

In constructing the tire it should be understood that the anchor plate 10 will first be built into the tire, the various anchor plates being placed in position as the tire is being built up. After the anchor plates are in position and the tire has been built above the disk, the upper parts of the prongs 9 will still project and then the receptacles 2 are placed in position and the prongs pass into them and are bent over the bottom edge around the perforation.

After the receptacle 2 is secured in place and the tire cured, it is filled with a rubber stud 11, shown in detail in Fig. 3. The stud 11 has an annular groove 12 also dove-tailed in section to fit the neck 3 of the receptacle, and the rubber stud is securely locked in the receptacle by the mechanical engagement therein, the dove-tail construction being such that the stud is much more securely held against dislodgement then otherwise. The anchor plate may also serve to act directly upon the stud to more securely hold it in place, one manner in which it may be so utilized being indicated in Fig. 2 in which 13 'designates the stud which in this case will preferably be of metal and which is vulcanized in the tire through the medium of threads 14 in a manner similar to that in which the receptacle 2 is vulcanized, although the stud 13 may be merely mechanically interlocked with the tire or simply cemented thereinto. The stud 13 has a lower flange 15 which is engaged by prongs 16 which project up from the anchor plate 17, the latter being embedded beneath canvas and rubber and vulcanized in the body of the tire. In this form the prongs 16 lie closer to the periphery of the disk 17 on account of the greater diameter of the flange 15. In this form it will be noted that even though the stud 13 is securely held in place by the interlocking action of the body of the tire its security is greatly increased by its being mechanically interlocked with the clencher prongs 16 which are securely anchored in the tire by means of the anchor plate 17. It is practically impossible to accidentally dislodge a stud when thus secured in the tire.

In tires heretofore constructed with metal studs arranged in the tread portion, the presence of the studs has necessitated perforations in the canvas, or other material, intervening between the head of the stud and its base, which perforations greatly weaken the canvas or other intervening material, and, therefore, not only is the stud less securely held but the tire itself is weakened. In my construction the anchor plate is located below the canvas and the small prongs from the anchor plate project up between the threads of the canvas and thus the canvas is not weakened as the threads thereof are not cut or destroyed to any appreciable extent.

Heretofore a common method of securing metal rivets in the tire has been to construct the base of the stud in the form of a washer which is riveted thereto, and in practice with such construction it has been found that the stud works loose where riveted to the washer, and for that reason a stud consisting of a single piece of metal, as in my construction, is preferable. The anchor plate as interlocked with the bottom of a stud has much greater holding strength than a rivet. In general, the objection to metal studs heretofore has been that they pull out of the tire on account of the limited amount of canvas, between the head of the stud and the bottom. Such objection is overcome in my invention by employing the anchor plate which firmly secures each stud in place.

What I claim is:

1. In a tire, a stud in the tread portion thereof, said stud comprising a head external of the tire and having a neck connecting the head with a flanged base embedded in the tread of the tire, an anchor plate comprising a disk embedded in the tire below the base of the stud and having clencher prongs which project up and are bent over the edge of the flange of the stud for more securely holding the stud.

2. In a tire, a one piece stud embedded in the tread portion thereof, an anchor plate embedded in the tire below the stud with intervening tire material between the anchor plate and stud, and means of connection between the anchor plate and the bottom part of the stud.

3. In a tire, a stud having a flanged bottom embedded in the tread portion thereof, an anchor plate embedded in the tire below the flanged bottom of the stud with intervening tire material between the anchor plate and stud, and means of connection between the anchor plate and the flanged bottom of the stud, said connection means comprising relatively slender connections of great tensile strength which pass through the canvas or other intervening material without appreciably weakening the same.

In testimony whereof, I have hereunto set my hand at Los Angeles, California, this 30th day of November, 1908.

JUNIUS A. BOWDEN.

In presence of—
G. T. HACKLEY,
FRANK L. A. GRAHAM.